METHOD OF AND MEANS FOR DIGITAL PROGRAMMING OF REGULATED POWER SUPPLIES

Filed Oct. 1, 1968

INVENTOR.
SARKIS NERCESSIAN
BY
Alfred W. Barber
ATTORNEY

United States Patent Office 3,566,252
Patented Feb. 23, 1971

3,566,252
METHOD OF AND MEANS FOR DIGITAL PROGRAMMING OF REGULATED POWER SUPPLIES

Sarkis Nercessian, Long Island City, N.Y., assignor to Forbro Design Corp., New York, N.Y., a corporation of New York Filed Oct. 1, 1968, Ser. No. 764,083
Int. Cl. G05f 1/10
U.S. Cl. 323—1 7 Claims

ABSTRACT OF THE DISCLOSURE

Relay operated switches are provided for programming a regulated power supply using a control bridge circuit. Bridge current and voltage control resistors are digitally selected adjustments to compensate for the switch resistance are used for improving accuracy in such a configuration.

DESCRIPTION OF PRIOR ART

Regulated power supplies have been widely used employing a bridge-like circuit as set forth in U.S. Pat. No. 3,028,538. The output of such a power supply is generally controlled by means for a variable resistor but the output also depends on other circuit components such as the reference voltage and the resistor in series with the reference voltage. The reference voltage and the resistor connected in series determine the "bridge" current or when the circuit is applied to an operational power supply, determines the "input" current. The present invention concerns methods of and means for digitally programming a power supply of the type described above. The digital programming system to be described provides both the voltage control resistor for the power supply and the bridge or input current as well as certain refinements for yielding extremely accurate results.

The input information is in the form of digital electrical signals in accordance with several well known formats. Digital to analog conversion has been accomplished in the past in many ways. The many forms depend on the type of input to be used and the type of output to be produced.

SUMMARY

The present invention embodies digital to analog conversion employing two steps; first, the digital signals are converted to a controlled resistance; and second, the controlled resistance is applied to determine the output of a resistance programmable power supply.

The controlled resistance is provided by means of relays shorting or opening circuits of a series of precision resistors. In order to prevent transients in the output of the power supply during the selection process, the power supply control points are disconnected and a holding capacitor substituted while any resistors are changed to new values.

Precision control of the output of the power supply requires high precision of the programming resistor. However, relay contacts and circuit wiring particularly when remote programming is employed, introduce residual errors. These errors are reduced, minimized or eliminated by introducing a bridge current dependent voltage into the input of the amplifier having an equal and opposite effect on the output voltage.

Since the voltage for compensating the extraneous control circuit resistance is introduced ahead of the power or output stage of the power supply, the description of the operation of the circuit can be clarified by separating the system into two parts; namely, voltage amplifier and power booster. The compensating voltage while proportional to bridge current is applied outside the bridge loop.

BRIEF DESCRIPTION OF THE DRAWINGS

FIG. 1 is a simplified diagram, partly in block form, of certain portions of the present invention. The present invention concerns methods of and means for programming an operational power supply here represented by voltage amplifier 1 having input terminals 2 and 2', a common terminal 3 and an output terminal 4, and power booster 37 having an input terminal 38, an output terminal 40 and a common terminal 39. Amplifier 1 drives booster 37 through the connection of output 4 to input 38. The voltage amplifier 1 together with the booster amplifier 37 provide 180 degrees phase change between terminals 2 and 40. The load 5 to be supplied with direct current power is connected between output terminal 40 and common terminal 39 so that none of the load current flows in lead 36. Output terminals 40 is returned to input terminal 2 through output voltage control resistor 15 (and switch 16–17). The bridge current is determined by the reference voltage as provided by a suitable source such as Zener diode 8 supplied with constant current from a suitable constant current source 9, acting through a reference resistor 10 or 11 connected through selector switch 12–13–14 and calibration means switch 28–29. The bridge current flows in a closed loop comprising reference Zener 8, reference resistor 10 (or 11), voltage control resistor 15, through the output terminal 40 and booster amplifier 37 to common lead 36 and back to Zener 8. The bridge is balanced when the bridge current drop through reference resistor 10 (or 11) is equal to the reference voltage and the bridge current drop in the voltage control resistor 15 is equal to the output voltage of the amplifier across load resistor 5. The bridge current is equal to the reference voltage in volts divided by the reference resistor in ohms. This bridge balance assumes the input voltage and input current between amplifier input terminal 2 and common terminal 3 is zero. This condition can be assured by providing and adjustable source of voltage 27 and an adjustable source of current 26. The zero input voltage adjustment is made with switch 28–29 open removing any external input and switch 30–31 closed to prevent any effect of input current, and adjusting voltage 27 for zero voltage across load terminals 39–40. The zero input current adjustment is made with switch 28–29 open to remove any source of external current and switch 16–17 closed with resistor 15 at some high value to produce a voltage drop due to input current, and adjusting current source 26 for zero voltage across load terminals 39–40.

Figure 1:
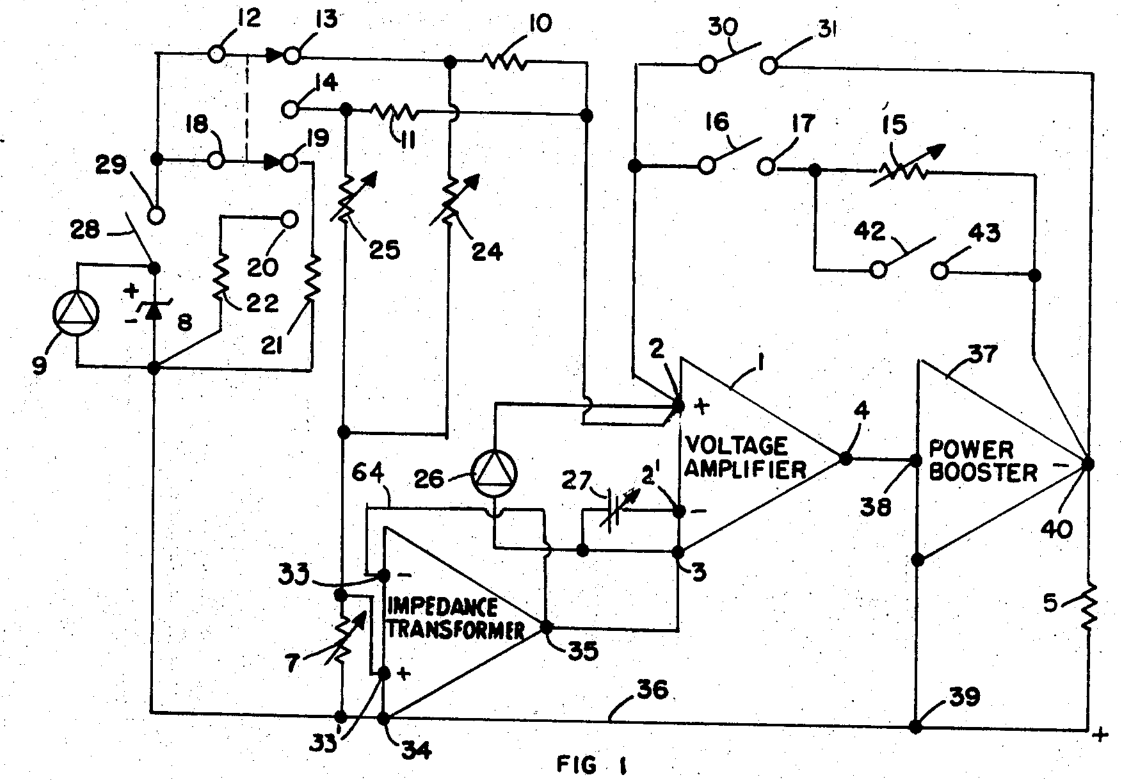
FIG. 1 is a schematic circuit diagram partly in block form showing the method of and means for introducing the voltage for compensating the extraneous control circuit resistance.

As has been stated above the output voltage is a function of bridge current and voltage control resistance 15. Thus, with a given voltage control resistor or series of resistors, the output voltage can be stepped or its range changed by changing the bridge current. This is accomplished by switch 12–13–14 which selects the reference resistor, either resistor 10 or resistor 11. Since this bridge current is drawn from the reference voltage source, Zener diode 8 if nothing further were done, the Zener current would change when the reference resistor is changed. In order to keep the Zener current constant, a condition for maximum accuracy of a Zener generated reference voltage, one of compensating resistors 21 and

22 is automatically switched across Zener 8 by switch 18–19–20 ganged with switch 12–13–14. Resistors 21 and 22 are chosen so that in either switch position the equivalent load on the Zener is constant. While only two sets of resistors and two switch positions are shown, it will be evident that any number of additional sets of resistors and switch positions may be provided fulfilling the same conditions of constant load while providing any number of additional values of bridge current and hence output voltage ranges.

The system shown in FIG. 1 is particularly intended for accurate programming of load voltage by changing the value of voltage control resistor 15. However, when resistor 15 is made to simulate zero with the object of providing zero output voltage as by closing switch 42–43 with switches 28–29 and 16–17 also closed residual resistance between output terminal 40 and input terminal 2 provides voltage drop equal to the particular bridge current being employed and the total residual resistance which in turn produces an equal and non-zero output voltage. This residual resistance is made up of circuit wiring resistance, switch contact resistance (switches 16–17 and 42–43) and is particularly serious in remote programming set-ups where long leads may exist in the circuit. It has been found that this residual voltage can be effectively countered and its effect substantially eliminated by introducing an equal off-setting voltage between the amplifier common point 3 and the load return 39 (line 36). This voltage could be provided as a drop across a resistor supplied with current proportional to the bridge current such as the drop across resistor 7 provided by current as determined by one of resistors 24 and 25 automatically selected by switch 12–13–14 as by connecting resistor 7 between common 3 and common 39. Obviously, if any current flows in resistor 7 other than the intended bridge current and proportional current supplied by resistor 24 or 25, the drop will change from its intended value. If resistor 7 were small enough and the current large enough, extraneous current can be swamped. However, such a solution may unduly load the reference Zener 8. It has been found that a small current which is a function of the drive supplied to power booster 37 flows from terminal 4 to terminal 38 and then returns over lead 36 and through any impedance as, for example, resistor 7 connected from line 36 to common terminal 3. It has been found advantageous to supply the compensating voltage across resistor 7 through a unity gain repeater acting as an effective impedance transformer 32. Impedance transformer 32 is a high gain amplifier having a non-inverting input terminal 33′, an inverting input terminal 33, an output terminal 35 and a common terminal 34. The inverting input terminal 33 is shorted to output terminal 35 providing 100 percent feedback and hence unity gain. Such an amplifier operated at unity gain will provide an output path from output terminal 35 to common terminal 34 which is effectively many times smaller than the input impedance of resistor 7. Thus, when the voltage across resistor 7 is connected to input 33′–34 and output 35 is connected to common terminal 3, the compensating voltage across resistor 7 is effectively repeated between common terminal 3 and common line 36 and at a greatly reduced effective impedance. In fact this impedance is so low as to be virtually unaffected by the extraneous return current described above. The adjustments for this extraneous voltage can be made with all voltage control resistance in the path from output terminal 40 to input terminal 2 shorted as by closing switches 16–17 and 42–43 and with bridge current switch 12–13–14 first closed 12 to 13 for the bridge current determined by resistor 10 and by adjusting resistor 24 and then closed 12 to 14 for the bridge current determined by resistor 11 and by adjusting resistor 25 so that the output voltage from terminal 40 to common terminal 39 is zero.

Thus, in describing FIG. 1 a programmable power supply system has been described in which a high degree of accuracy is achieved by balancing out input current and input voltage, automatically maintaining the load on the reference voltage source constant for any value of bridge current and by off-setting the voltage drop in the voltage control circuit due to residual circuit and contact resistance for any value of bridge current.

Figure 2:
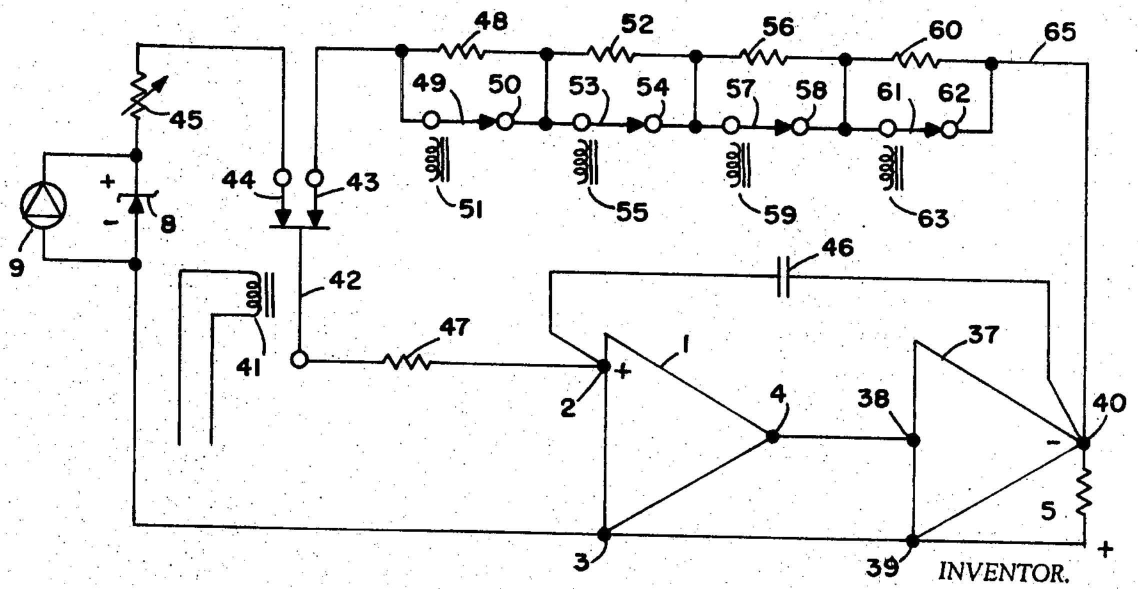
FIG. 2 is a schematic circuit diagram partly in block form showing the method of and means for holding the output voltage during switching of the voltage control resistors to prevent transients in the output voltage.

FIG. 2 is a simplified schematic circuit diagram partly in block form showing another feature of the present invention. Generally the circuitry particularly shown in FIG. 1 has been omitted in order to clarify the description although the circuits of FIGS. 1 and 2 are coextensive in the complete system. FIG. 2 particularly points out the method of and means for changing the voltage control resistor without causing transients across the load terminals. The voltage control resistor is composed of a number of series connected resistors as 48, 52, 56 and 60 generally forming a binary series 1–2–4–8 so that, depending on which resistors are in circuit, any value forming a decade in ten steps may be made available by opening or closing suitable combinations of the relay shorting switches 49–50, 53–54, 57–58 and 61–62 as by means of relay coils 51, 55, 59 and 63 respectively. It has been found that attempting to open and close these switches when changing the output voltage causes transients in the output due to the random manner in which the switches open and close when actuated in a very short time interval. Thus, in accordance with the present invention, a relay switch 42–43–44 is provided operable by means of relay actuator 41 which is opened before switching of the voltage control resistors and/or changing the bridge current determined by adjustable resistor 45. In order to maintain the output voltage at its prior setting during such switching, a capacitor 46 is connected from output terminal 40 to input terminal 2. The voltage across capacitor 46 will be equal to the load voltage and when switch 42–43–44 is opened removing the bridge circuit current source and voltage control resistor from input 2, this voltage will be held across capacitor 46 maintaining the output voltage constant until switch 42–43–44 is closed again. While switch 42–43–44 is open the value of the voltage control resistor 48–52–56–60 may be changed and the bridge current may be changed. When switch 42–43–44 is closed again a new output voltage is programmed and a new voltage equal to this new output voltage is established across capacitor 46. The transistors from the old output voltage to the new output voltage will be smooth as capacitor 46 assumes a new charge voltage. Capacitor 46 may be chosen to be large enough to hold the output voltage during the switching cycle but not so large that the charging current cannot establish the new voltage within a reasonable time. Thus, the cycle of operation includes; first, opening switch 42–43–44; second, switching voltage control resistors and/or bridge current; third, closing switch 42–43–44 to establish a new output voltage.

While only one form of the present invention has been shown and described, modifications may be apparent to those skilled in the art within the spirit and scope of the invention as set forth, in particular, in the appended claims.

I claim:

1. In a regulated power supply output voltage programming system the combination of:

means for completing a four terminal bridge circuit including first, second, third and fourth terminals wherein said first and second terminals are the load terminals for the power supply;

power amplifier means including an input terminal connected across said first and second terminals;

voltage amplifier means including an input terminal, an output terminal and a third terminal wherein said input terminal is connected to said third terminal of said bridge circuit to receive unbalance current from said bridge, said output terminal is connected in driving relationship to said power amplifier means, and said third terminal of said voltage amplifier is adapted to receive voltage to affect the output of said voltage amplifier in the opposite direction to current applied to said input terminal;

a voltage control resistor means connected between said second and third bridge terminals comprising predetermined resistance means and extraneous resistance;

a reference voltage means connected betwen said first and fourth bridge terminals;

a bridge current determining resistor connected between said third and fourth bridge terminals;

and a source of voltage proportional to said bridge current connected between said first bridge terminal and said third voltage amplifier terminal for offsetting the bridge current drop in said extraneous resistance in said voltage control resistance means.

2. A regulated power supply output voltage programming system as set forth in claim 1 and including means for programming said source of voltage in accordance with said bridge current determining resistor.

3. A regulated power supply output voltage programming system as set forth in claim 1 and including relay controlled switching means for changing said voltage control resistor means.

4. A regulated power supply output voltage programming system as set forth in claim 1 and including relay operated switch means opening the said three connections to said third bridge terminal.

5. A regulated power supply output voltage programming system as set forth in claim 4 and including a capacitor connected between said second bridge terminal and said input terminal of said voltage amplifier.

6. A regulated power supply as set forth in claim 1 and switch means for changing said voltage control resistor means.

7. In a regulated power supply output voltage programming system the combination of:

means for determining the output voltage of said power supply including independent resistive means and voltage means;

capacitative means connected across said resistive means;

means for changing said resistive means;

and switch means for opening the circuit of said voltage and resistive means while changing said resistive means while continuing the circuit of said capacitative means to slow any change in the output of said power supply while said resistive means is being changed.

References Cited

UNITED STATES PATENTS

| | | | |
|---|---|---|---|
| 3,241,042 | 3/1966 | Rosenfeld et al. | 323—22(T) |
| 3,303,412 | 2/1967 | Gately | 323—4 |
| 3,336,523 | 8/1967 | Rosenfeld | 323—22(T) |
| 3,388,317 | 6/1968 | Birman | 323—22(T) |

J D MILLER, Primary Examiner

G. GOLDBERG, Assistant Examiner

U.S. Cl. X.R.

323—22, 40